June 7, 1938.                H. D. GEYER                2,120,026
                             FREEZING TRAY
                          Filed Sept. 9, 1933           2 Sheets-Sheet 1
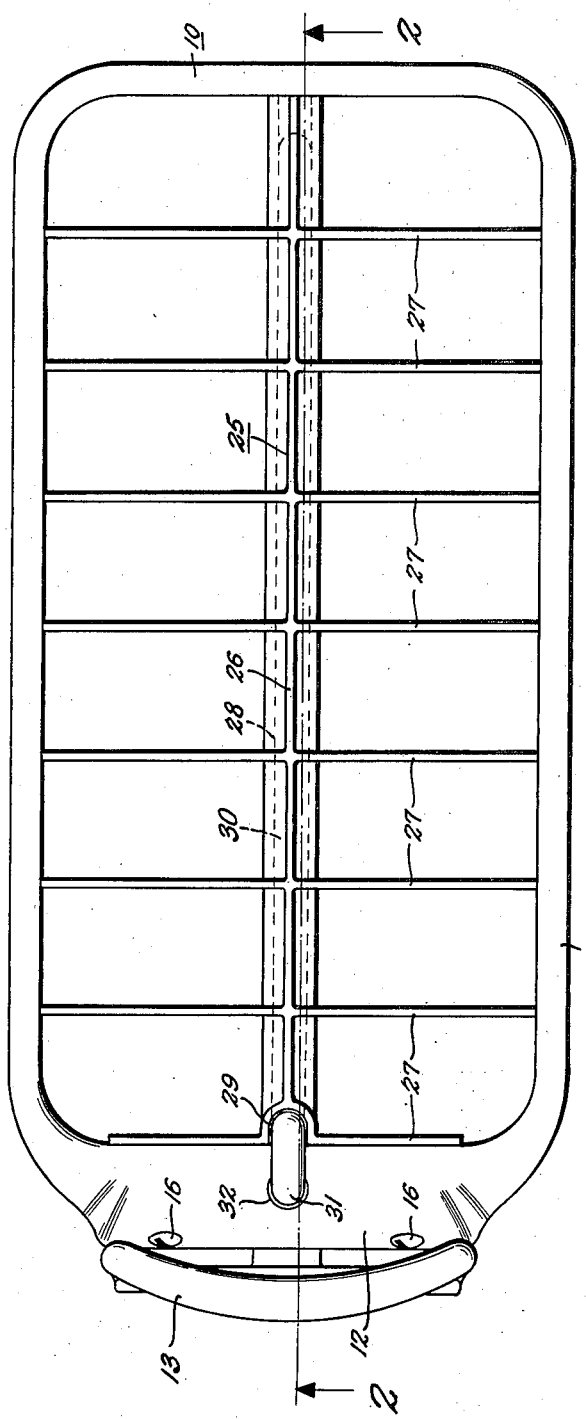
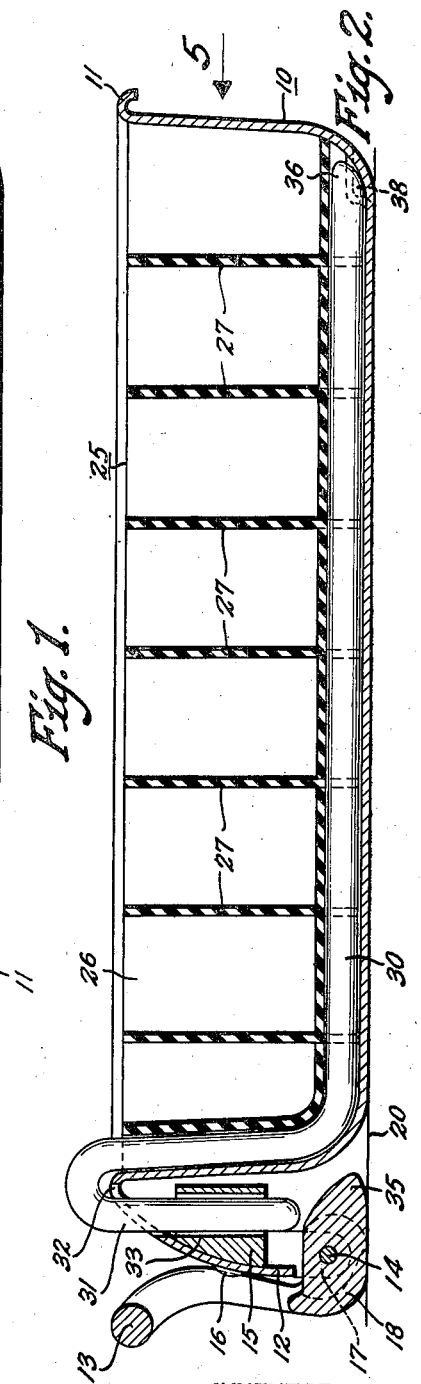
INVENTOR
Harvey D. Geyer
BY
Spencer Hardman & Fehr
HIS ATTORNEYS June 7, 1938.  H. D. GEYER  2,120,026
FREEZING TRAY
Filed Sept. 9, 1933   2 Sheets-Sheet 2
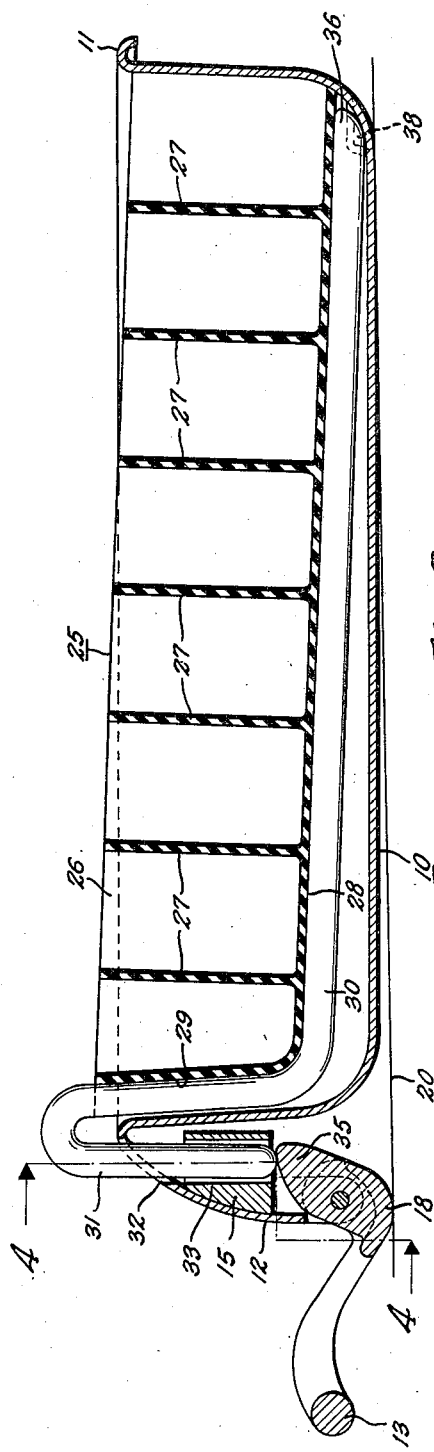
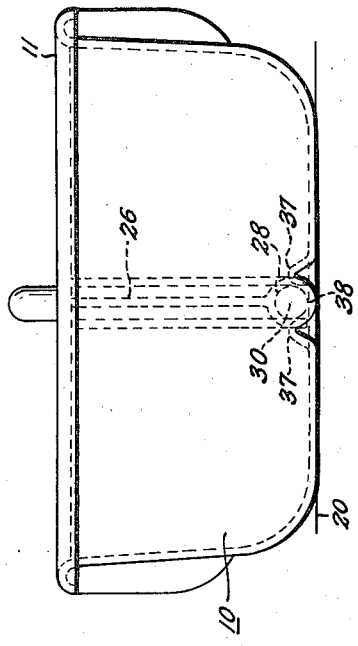
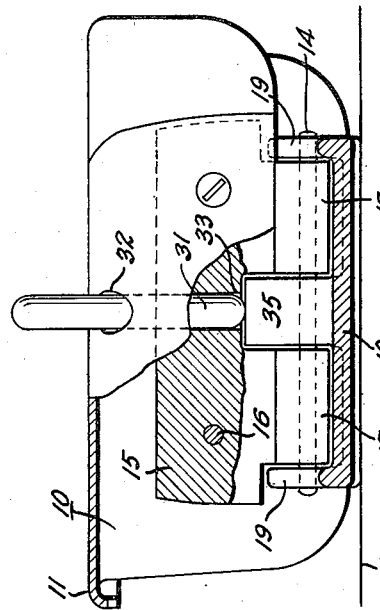
INVENTOR
*Harvey D. Geyer*
BY
*Spencer Hardman & Fehr*
HIS ATTORNEYS Patented June 7, 1938

2,120,026

UNITED STATES PATENT OFFICE 2,120,026

FREEZING TRAY

Harvey D. Geyer, Dayton, Ohio, assignor, by mesne assignments, to General Motors Corporation, Detroit, Mich., a corporation of Delaware Application September 9, 1933, Serial No. 688,715

10 Claims. (Cl. 62—108.5)

This invention relates to freezing trays adapted for use in household refrigerators.

An object of this invention is to provide a freezing tray having simple and efficient means for positively loosening the frozen bond of the ice blocks from the container pan and partially ejecting same.

Another object is to provide an efficient device for accomplishing the above object while also breaking or loosening the frozen bond of the container pan to its support upon which it rests while freezing takes place.

Further objects and advantages of the present invention will be apparent from the following description, reference being had to the accompanying drawings, wherein a preferred embodiment of one form of the present invention is clearly shown.

In the drawings:

Fig. 1 is a plan view of a freezing tray made according to this invention.

Fig. 2 is a section taken on line 2—2 of Fig. 1 and shows all the parts in normal or freezing position.

Fig. 3 is similar to Fig. 2 but shows the container pan being lifted from its support and the grid being lifted from the pan by the actuation of the handle.

Fig. 4 is a section on line 4—4 of Fig. 3.

Fig. 5 is an end elevation looking in the direction of arrow 5 of Fig. 2.

Similar reference characters refer to similar parts throughout the several views.

10 designates the metal container pan which is shown as having a small peripheral flange 11 which merges into a relatively deep downwardly curved front flange 12 upon which the handle 13 is pivotally supported. A small metal bracket 15 is rigidly fixed to the inner side of the front flange 12 by two screws 16, or by any other suitable means. Bracket 15 has two integral depending lugs 17 with aligned apertures through which the pivot pin 14 extends. Handle 13 has an integral base 18 with apertured ears 19 (see Fig. 4) through which pivot pin 14 extends, whereby handle 13 is pivotally mounted upon the bracket 15. The base 18 of handle 13 is so shaped relative to pin 14 that it provides a cam surface for engaging the pan support 20 when handle 13 is moved from its position shown in Fig. 2 to that shown in Fig. 3, and thereby force the pan 10 upwardly from its support 20. This action will automatically free the frozen bond between pan 10 and support 20 and hence greatly facilitate the withdrawal of the tray from the freezing chamber, simply by pulling on the handle 13.

The added feature of this invention is the means for also loosening the frozen bond between the partitioning device 25 in pan 10 and the frozen contents and the container pan by the handle 13. The partitioning device illustrated is a molded flexible rubber grid 25 having a central longitudinal partition 26 and a series of transverse partitions 27 integral therewith. This rubber grid 25 has an open-bottom molded groove 28 underlying the central partition 26 and extending up the front end of the grid as shown at 29 in Fig. 1. A loose curved metal bar or rod 30 fits snugly within this groove 28 and 29 and rests upon the bottom of pan 10 as clearly shown in Fig. 2. At the front of the tray bar 30 curves upwardly over the upper edge of the pan 10 and the depending portion 31 thereof extends loosely through hole 32 in flange 12 and through the guide hole 33 in bracket 15. It is thus seen that the rubber grid 25 overlies and fits snugly upon the bar 30 and will be lifted up when bar 30 is forced upwardly. The base 18 of handle 13 has a cam lug 35 integral therewith which engages the bottom end of portion 31 of bar 30 when handle 13 is moved about its pivot pin 14, and thereby forces the front end of bar 30 upwardly a short distance with a high force which is sufficient to break the frozen bond between the pan 10 and its contents. The rear end 36 of bar 30 fulcrums upon the bottom of pan 10 during this tilting movement. Preferably the bottom of pan 10 is bumped up as shown at 37 in Fig. 5 to provide a short socket 38 for retaining the end 36 of bar 30 in place during such tilting.

In operation, the tray parts are assembled as shown in Fig. 2 and the pan 10 is filled with water or other liquid to be congealed and placed upon the support 20 in a freezing compartment. After the contents have solidified the handle 13 is swung downwardly, which first causes cam 18 to force the pan 10 upwardly and break its possible frozen bond with support 20 which permits the tray to be easily withdrawn. Either before or after withdrawal of the tray, upon further swinging of handle 13 the cam 35 engages the lower end of portion 31 and progressively tilts the rod 30 and the overlying rubber grid 25 upwardly relative to pan 10 to break the frozen bond between the pan and its contents. Since only the inner ends of the ice blocks overlie rod 30 and the flexible rubber flange forming the groove 28, the initial loosening effect upon each ice block obviously will be the tilting of its inner end upwardly relative to the side walls of pan 10. The flexibility of the transverse partitions 21 readily permits such tilting action, and this flexing also tends to loosen the ice blocks therefrom. Thereafter the grid 25 and its frozen contents may be easily removed partially or entirely from the pan 10, whereupon the ice blocks will either fall out or may be easily pressed from the open-sided pockets of the flexible rubber grid. Preferably the rod 30 has such flexibility that the force of cam 35 thereupon will first cause it to progressively bend away from the pan front wall to facilitate the breaking of the ice bond at that point, and thereafter to progressively bend away from the pan bottom to facilitate the breaking of the ice bond along the bottom. Hence after the breaking of the ice bond between pan 10 and its contents is once started by a relatively large initial force upon portion 31 of rod 30 it will proceed more easily in a progressive manner from the front end of the tray to the rear end thereof. During this loosening operation the pan 10 itself will also flex in an opposite direction a small amount which obviously facilitates the breaking of the ice bond between the pan and its contents.

While the form of embodiment of the present invention as herein disclosed, constitutes a preferred form, it is to be understood that other forms might be adopted, all coming within the scope of the claims which follow.

What is claimed is as follows:

1. A freezing tray comprising: a container pan having a handle movably attached thereto, a flexible non-metallic partitioning device within said pan and having a metal bar engaging a portion thereof, said bar having one end projecting over an edge of said pan, and means actuated by the movement of said handle for urging said bar and device upwardly relative to said pan and simultaneously loosening the ice from said non-metallic partitioning device.

2. A freezing tray comprising: a container pan having a lever pivoted thereupon, a flexible rubber partitioning device within said pan having a central flexible partition wall, a relatively rigid bar underlying said flexible wall, and means actuated by the movement of said lever for tilting said bar and device upwardly from said pan.

3. A freezing tray comprising: a container pan having a lever pivoted thereupon, a flexible rubber grid within said pan having a flexible partition wall, a metal bar engaging said flexible wall, and means associated with said bar and actuated by said lever for moving said bar and flexing said grid.

4. A freezing tray adapted to rest upon a support, comprising: a container pan having a handle pivotally mounted thereupon, a movable distortable rubber grid within said pan, and means actuated by the pivotal movement of said handle for distorting said grid to loosen the ice bond therewith.

5. A freezing tray comprising: a container pan, a handle movably attached thereto, a removable partitioning device within said pan having a flexible partition wall, a metal lifting bar engaging said partitioning device and actuatable to lift said flexible wall, and means actuated by the movement of said handle for urging said metal bar upwardly and loosening the ice from said flexible wall.

6. A freezing tray comprising: a container pan, a removable flexible non-metallic grid having a main flexible wall, a relatively rigid lifting bar underlying said main flexible wall of said grid and loosely associated therewith, and force-multiplying means reacting between said pan and lifting bar and serving to force said bar and grid upwardly from said pan to facilitate the removal of the frozen ice contents.

7. A freezing tray comprising: a container pan, a removable flexible non-metallic grid having a main flexible wall, a relatively rigid lifting bar underlying said main flexible wall and at least in part readily separatable therefrom after said grid and bar have been removed from said pan, and force-multiplying means reacting between said pan and lifting bar and serving to force said bar and grid upwardly from said pan.

8. A freezing tray comprising: a container pan, a removable flexible non-metallic grid having a main flexible wall having a longitudinal groove therein at its bottom edge, a relatively rigid lifting bar underlying said main wall and loosely located within said groove, and force-multiplying means associated with said pan and lifting bar and serving to force said bar and the overlying main wall of said grid upwardly from said pan to facilitate the removal of the frozen ice contents from said pan.

9. A freezing tray comprising: a container pan, a flexible rubber grid member therein having a flexible rubber wall, a metallic lifting member underlying said rubber wall and loosely associated therewith in such manner as to be at least in part readily separatable therefrom, and means for forcing upwardly from said pan said bar and its overlying rubber wall and thereby serving to break the frozen bond between said pan and its frozen contents.

10. A grid member for an ice tray including a relatively rigid reinforcing lifting bar which is removable from the tray, and a soft rubber partitioning wall mounted on said lifting bar so that at least a part of said soft rubber wall can be readily pulled away from said relatively rigid lifting bar.

HARVEY D. GEYER.